Aug. 14, 1934.    R. H. SMITH    1,970,151

SKILLET

Filed June 16, 1933

Inventor;
RAYMOND H. SMITH:
By Robert W. Caudle,
Attorney.

Patented Aug. 14, 1934

1,970,151

UNITED STATES PATENT OFFICE 1,970,151

SKILLET

Raymond H. Smith, Richmond, Ind., assignor of one-half to Newton W. Long, Richmond, Ind.

Application June 16, 1933, Serial No. 676,149

5 Claims. (Cl. 53—7)

My present invention relates to the construction of skillets or frying pans, and the objects of my invention are, first, to provide a skillet which will have an even distribution of heat under its entire lower surface, thereby requiring a minimum amount of fuel while being used.

Another object is to provide a skillet which will withstand intense heat without warping or cracking; and a further object is to provide a skillet or frying pan which may be manufactured and sold at a very low cost.

Other objects and particular advantages of my invention will suggest themselves in the course of the following description, and that which is new and useful will be set forth in the appended claims.

The preferred means for carrying out the principles of my invention in a practical, efficient, and economical manner is shown in the accompanying drawing in which—

In order to make clear the details of my invention and the construction thereof, I will now set forth the same as fully and comprehensively as I may, but it is to be understood that the construction which I show and describe may be slightly modified without departing from the spirit of my invention.

Similar numerals designate like parts throughout the several views.

Figure 4:
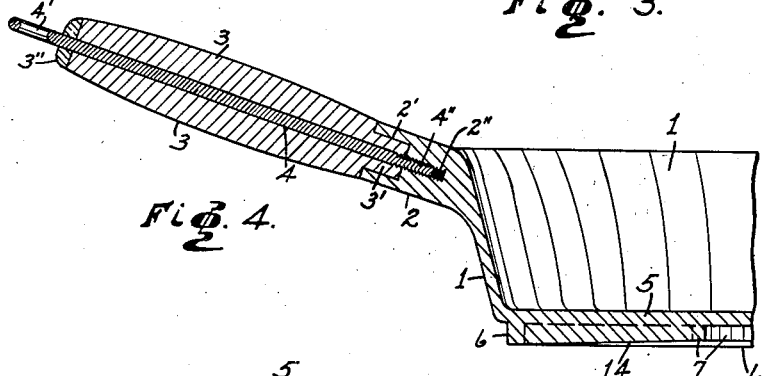
Figure 4 is a detail longitudinal section as taken on line 4—4 of Figure 2, but on an enlarged scale.
Figure 5:
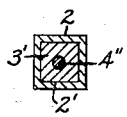
Figure 5 is a detail cross section as taken on line 5—5 of Figure 2, but on an enlarged scale.
Figure 6:
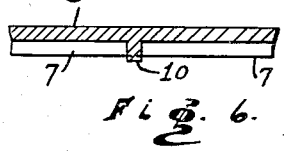
Figure 6 is a detail cross section as taken on line 6—6 of Figure 2, but on an enlarged scale.

The numeral 1 designates the flanged side of my skillet, which is of the conventional type and is formed integrally with the bottom portion 5. Formed integrally with the side 1 is the extended portion 2 which is tapered so as to present a neat and finished appearance in connection with the handle 3. The member 2 has a square shaped aperture 2' formed in its outer end for the reception of the handle 3, the extended portion 2 also has a threaded aperture 2'' formed therein for the reception of the threaded portion 4'' of the rod 4 as shown in Figure 4. The rod 4 extends through the handle 3 and has an eye 4' formed at its outer end which provides means for hanging the skillet on a nail or hook while not in use and also for turning the rod into the threaded aperture 2''. The handle 3 is preferably made of hard wood and is of a generally round or oval shape in cross section and has an aperture formed longitudinally through its center for the reception of the rod 4. The handle 3 also has a square shaped end 3' which is of such a size that it will fit snugly into the aperture 2' of the extended portion 2. At the outer end of the handle 3 is a metal ferrule 3'' which serves as a protection to the end of the handle against splitting or wearing by the eye 4' of the rod 4. The ferrule 3'' is shaped around its periphery to conform to the profile of the handle 3, and has an aperture through its center for the reception of the rod 4.

It is therefore evident that the handle 3 may be attached by inserting the square shaped end 3' in the square shaped aperture 2' of the extended portion 2, then inserting the rod 4 through the handle and turning the rod into the threaded aperture 2'' of the extended portion 2, likewise the removal of the handle 3 would be the reverse of the operation just described. The handle is made removable for the purpose of using the skillet as a roasting utensil in an oven or the like.

Figure 1:
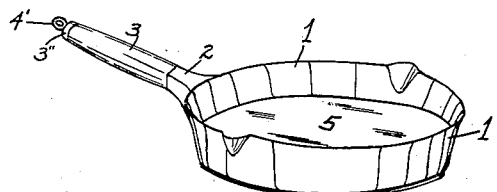
Figure 1 is a perspective view of my skillet or frying pan.
Figure 2:
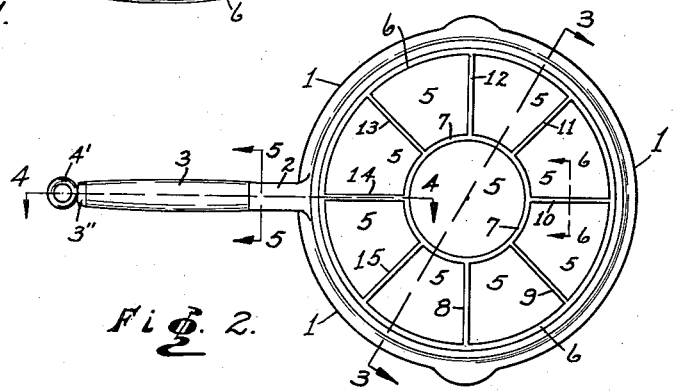
Figure 2 is a bottom view of my skillet and shows the arrangement of the ridges on the under side of the bottom.
Figure 3:
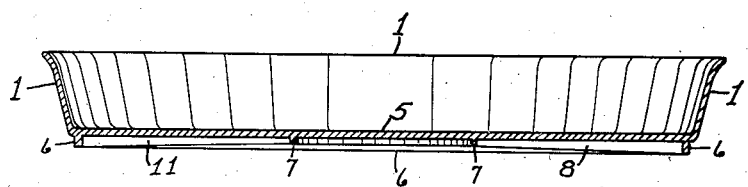
Figure 3 is a detail cross section as taken on line 3—3 of Figure 2, but on an enlarged scale.

The numeral 5 designates the bottom portion of my skillet which is smooth on its upper surface as is the conventional type of skillets. The numeral 6 designates a circular ridge integrally formed with the bottom 5 and extends continuously around the lower edge thereof as shown in Figure 2. The numeral 7 designates another circular ridge which is located concentrically within the ridge 6. The ridge 7 is formed integral with the bottom 5 as is the ridge 6, but does not extend downwardly as far as does the ridge 6. The numerals 8, 9, 10, 11, 12, 13, 14 and 15 designate auxiliary ridges formed integral with the bottom 5 and the ridges 6 and 7. The auxiliary ridges 8, 9, 10, 11, 12, 13, 14 and 15 extend radially from the ridge 7 to the ridge 6, and finish flush at their inner ends with the lower edge of the ridge 7 and at their outer ends with the lower edge of the ridge 6. The lower edges of the auxiliary ridges 8, 9, 10, 11, 12, 13, 14 and 15 extend outwardly and downwardly from the circular ridge 7 to the circular ridge 6 as shown in Figures 3 and 4.

It will be plainly seen that the circular ridge 6 will confine applied heat within its circumference while being in use on a flat or smooth surface such as the cooking top of a stove, and the inner circular ridge 7 together with the auxiliary ridges 8, 9, 10, 11, 12, 13, 14 and 15 will distribute the heat evenly to the entire lower surface of the bottom 5.

It has been proven by tests that the arrangement of the ridges as shown in Figure 2 prevents warping of the bottom of the skillet which frequently occurs with skillets of the ordinary or conventional type.

It is to be understood that my invention is especially intended to be employed in connection with aluminum skillets or other utensils, for the reason that aluminum is particularly susceptible to warping when heated to a certain degree of temperature. I entirely eliminate any such eventuality by my construction, in that the ridges act as braces and tend to retain the metal in its normal shape even when excessive heat is applied thereto. Also said ridges perform another important function in that they prevent direct contact of the bottom of the skillet with a stove thereby reducing the danger of overheating the bottom for the reason that they provide air spaces between the stove and the bottom of the skillet. Also by reason of the fact that only the outer circular ridge is in direct contact with the stove; therefore no part of the skillet, the smaller circular ridge or the auxiliary ridges contact with what is usually the hottest part of the stove.

Having now fully shown and described my invention, what I claim and desire to secure by Letters Patent of the United States is:—

1. A frying pan comprising a bottom having a flat upper surface surrounded by an upwardly disposed side extending therearound, a small downwardly extending circular ridge integrally formed with the bottom of the frying pan, a large downwardly extending circular ridge integrally formed with the outer edge of the bottom and extending downwardly a greater distance than the small circular ridge, a plurality of auxiliary ridges formed integrally with the bottom of the frying pan and extending radially from the small circular ridge to the large circular ridge and with their lower edges joining flush at their inner ends with the lower edge of the small circular ridge and at their outer ends with the lower edge of the large circular ridge.

2. A skillet comprising a bottom having a flat upper surface surrounded by an upwardly flaring side extending therearound, a circular ridge formed integral with the outer edge of the under surface of the skillet and extending downwardly therefrom, a comparatively smaller circular ridge formed integral with the under surface of the skillet and located concentrically within the larger circular ridge, the larger ridge extending downwardly a greater distance than the smaller circular ridge, a plurality of auxiliary ridges formed integral with the under surface of the skillet and extending radially from the inner circular ridge to the outer circular ridge, said auxiliary ridges joining flush at their inner ends with the lower edge of the inner circular ridge and at their outer ends with the lower edge of the outer circular ridge, all substantially as shown and described.

3. A skillet having a bottom whose upper surface is flat and having on its under side a plurality of equally spaced downwardly disposed integrally formed auxiliary ridges which converge toward the center of said bottom, a downwardly disposed small circular ridge integrally formed with the under side of the bottom of the skillet and with the inner ends of the auxiliary ridges, a downwardly disposed larger circular ridge integrally formed with the outer edge of the under side of the bottom and with the outer ends of the auxiliary ridges, said ridges being formed so that only the larger circular ridge will contact any smooth surface upon which the skillet may rest.

4. A skillet having a bottom and an upwardly extending circular flange, a downwardly disposed circular ridge formed integral with the outer edge of the under side of the bottom, a comparatively smaller downwardly disposed circular ridge formed integral with the under side of the bottom and located concentrically within the large circular ridge, auxiliary ridges formed integral with the under side of the bottom and extending convergently from the large circular ridge to the smaller circular ridge and formed integral therewith at their respective ends, said auxiliary ridges dividing the under surface of the bottom of the skillet into a plurality of spaces of equal area, said large circular ridge being the only ridge to contact the smooth surface of a stove upon which the skillet may rest and thereby confine the applied heat to the underside of the skillet and allow the heat to circulate evenly under the entire bottom surface of said skillet.

5. A skillet having a bottom surrounded by a circular and upwardly extending side formed integral therewith, the upper surface of said bottom being flat, a large circular imperforate ridge formed integral with and extending downwardly from around the lower edge of the bottom surface of the skillet, a comparatively smaller circular imperforate ridge formed integral with and extending downwardly from the under surface of the bottom, said smaller circular ridge being located concentrically within the large circular ridge and with its lower edge being on a higher plane than the lower edge of the large circular ridge, imperforate auxiliary ridges formed integral with and extending downwardly from the under side of the bottom, each auxiliary ridge being formed integral at its outer end with the large circular ridge and at its inner end with the smaller circular ridge, the outer ends of the auxiliary ridges being flush with the under side of the large circular ridge and their inner ends being flush with the under side of the smaller circular ridge, said auxiliary ridges arranged so as to form exposed portions of equal area on the under side of the bottom of the skillet.

RAYMOND H. SMITH.